United States Patent
Stone et al.

(10) Patent No.: US 7,333,685 B2
(45) Date of Patent: Feb. 19, 2008

(54) VARIABLE OPTICAL ATTENUATOR SYSTEMS

(75) Inventors: Thomas W. Stone, Hellertown, PA (US); John C. Kralik, Devon, PA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 415 days.

(21) Appl. No.: 10/720,816

(22) Filed: Nov. 24, 2003

(65) Prior Publication Data
US 2005/0111784 A1  May 26, 2005

(51) Int. Cl.
*G02B 6/26* (2006.01)
*G02B 6/42* (2006.01)

(52) U.S. Cl. .................. 385/16; 385/10; 385/15; 385/18; 359/484; 359/485; 359/495; 359/496

(58) Field of Classification Search ............... 385/16, 385/18; 359/15
See application file for complete search history.

(56) References Cited

U.S. PATENT DOCUMENTS

| | | | | |
|---|---|---|---|---|
| 5,692,077 A | * | 11/1997 | Stone et al. | 385/16 |
| 5,771,320 A | | 6/1998 | Stone | |
| 6,166,838 A | * | 12/2000 | Liu et al. | 398/1 |
| 6,563,974 B2 | * | 5/2003 | Agha Riza | 385/18 |
| 6,567,573 B1 | * | 5/2003 | Domash et al. | 385/16 |
| 6,585,382 B1 | * | 7/2003 | Stone | 359/839 |
| 2001/0033400 A1 | * | 10/2001 | Sutherland et al. | 359/15 |

OTHER PUBLICATIONS

U.S. Appl. No. 10/668,975, filed Sep. 23, 2003. Applicant: John C. Kralik et al. Title: Polarization Insensitive Optical Switching and Routing Systems and Methods of Manufacturing and Operation.

* cited by examiner

*Primary Examiner*—Frank G. Font
*Assistant Examiner*—Erin Chiem

(57) ABSTRACT

Low loss, reliable variable optical attenuators and 1×2 switches and polarization insensitive low loss, reliable variable optical attenuators and 1×2 optical switches are described. In one embodiment, a system of the present invention includes a polarization separating sub-system a polarization recombining sub-system and one or more switchable volume diffraction gratings to provide polarization insensitive low loss, reliable variable optical attenuators and 1×2 optical switches.

7 Claims, 11 Drawing Sheets

VARIABLE OPTICAL ATTENUATOR SYSTEMS

FIELD OF THE INVENTION

The present invention relates generally to interconnection and switching systems, and, more particularly, to optical switching/routing (interconnecting) systems which incorporate the use of selectable switching and routing components.

BACKGROUND OF THE INVENTION

In many current and future systems light beams are modulated in a digital and/or analog fashion and are used as "optical carriers" of information. There are many reasons why light beams or optical carriers may be preferred in these applications. For example, as the data rate required of such channels increases, the high optical frequencies provide a tremendous improvement in available bandwidth over conventional electrical channels such as formed by wires and coaxial cables. In addition, the energy required to drive and carry high bandwidth signals can be reduced at optical frequencies. Furthermore, optical channels, even those propagating in free space (without waveguides such as optical fibers) can be packed closely and even intersect in space with greatly reduced crosstalk between channels.

Optical attenuators perform numerous tasks associated with optical signal transmission systems. One function of an attenuator is to reduce the intensity of an optical signal which enters a photosensitive component. Photosensitive components are affected by variations in light intensity. Therefore, an attenuator causes the light intensity to be within the dynamic range of the photosensitive components. By using an attenuator, damage to the component is precluded. Additionally, the component does not become insensitive to small changes in the optical signal.

In other applications, attenuators serve as noise discriminators by reducing the intensity of spurious signals received by the optical device to a level below the device's response threshold. Moreover, optical attenuators are used to reduce the power of optical signals from an input fiber to an output fiber, and especially to balance optical power between several lines of an optical system. Many optical attenuators are also capable of actively attenuating an optical signal. Variable attenuators are required in some applications where different optical components require dissimilar incident optical signals, and hence variable sensitivities and saturation points. A fixed (i.e., passive) attenuation device is impractical for this purpose.

Attenuators serve to maintain the light level at a constant to compensate for component aging i.e., loss of efficiency in fiber amplifiers and reduced laser output from source, and changing absorption in optical waveguides. Variable attenuators serve to control feedback in optical amplifier control loops to maintain a constant output (e.g., as an automatic gain control element (AGC)).

Some variable attenuator designs require mechanical components or a number of optical components. Both of this type of attenuators exhibit a number of characteristics that are not desirable, such as high manufacturing and assembly costs, reduced reliability and extreme sensitivity to alignment.

There is a need for low loss, reliable variable optical attenuators.

A common problem encountered in applications in which high data rate information is modulated on optical carrier beams is the switching of the optical carriers from among an array of channels. These differing optical channels may represent, for example, routes to different processors, receiver locations, or antenna element modules. One approach to accomplish this switching is to extract the information from the optical carrier, use conventional electronic switches, and then re-modulate an optical carrier in the desired channel. However, from noise, space, and cost perspectives it is sometimes more desirable to directly switch the route of the optical carrier from the input channel to the desired channel, without converting to and from the electronic (or microwave) regimes.

A problem that is typical in optical switching systems is the insertion loss they impose. Some switching systems divide the input signal power into many parts, and block (absorb) the ones that are not desired. Others use switches that are inefficient and absorb, scatter, or divert a significant part of the input signal.

A commonly utilized optical switch is a one input, two output switch, also referred to as a 1×2 switch. There is a need for low loss, reliable 1×2 switches.

It is one object of this invention to provide polarization insensitive variable optical attenuators and 1×2 switches.

It is another object of this invention to provide low loss, reliable 1×2 switches.

It is a further object of this invention to provide low loss, reliable variable optical attenuators.

BRIEF SUMMARY OF THE INVENTION

The objects set forth above as well as further and other objects and advantages of the present invention are achieved by the embodiments of the invention described hereinbelow and set out in the claims appended hereto.

Low loss, reliable variable optical attenuators and 1×2 switches and polarization insensitive low loss, reliable variable optical attenuators and 1×2 optical switches are disclosed in the present invention.

In one embodiment, a system of the present invention includes a polarization separating sub-system a polarization recombining sub-system and one or more switchable volume diffraction gratings to provide polarization insensitive low loss, reliable variable optical attenuators and 1×2 optical switches. The polarization separating sub-system is optically disposed to receive an input optical beam of arbitrary polarization and is also capable of separating the input optical beam into a first optical beam of a first polarization and a second optical beam of a second distinct, orthogonal polarization. The polarization separating sub-system is also capable of emitting a first emitted optical beam of the first polarization and a second emitted optical beam of the first polarization, the emitted first and emitted second optical beams constituting an input channel of the first polarization. The one or more switchable volume diffraction gratings are optically disposed to receive the input channel and are also capable of providing one or more transmitted channels. The one or more transmitted channels include at least one transmitted optical beam of the first polarization and at least one other transmitted optical beam of the first polarization. The polarization recombining sub-system is optically disposed to receive the at least one transmitted optical beam of the first polarization and the at least one other transmitted optical beam of the first polarization and is capable of recombining the at least one transmitted optical beam of the first polarization and the at least one other transmitted optical beam of the first polarization into at least one final output beam of combined polarization.

For a better understanding of the present invention, together with other and further objects thereof, reference is made to the accompanying drawings and detailed description and its scope will be pointed out in the appended claims.

BRIEF DESCRIPTION OF THE SEVERAL VIEWS OF THE DRAWINGS

FIG. 6b is a side view of the schematic representation of an embodiment of the polarization converting system of FIG. 6a;

DETAILED DESCRIPTION OF THE PREFERRED EMBODIMENTS

In order to better understand the present invention described below, it should be noted that certain terms used in the description of the invention have been used interchangeably.

In the following descriptions of the present invention, the terms such as "light" and "optical radiation" may be used interchangeably, and these terms both include electromagnetic radiation over the entire spectrum of wavelengths such as, for example, ultraviolet, visible, and infrared. Also, the term "optical", for example, as applied to components and systems, refers not only to optical components and systems, but also to electro-optical components and systems.

Furthermore, terms such as "beams" and "channels" may also be interchanged, in certain instances, based upon their usage as recognized in the art.

Low loss, reliable variable optical attenuators and 1×2 switches and polarization insensitive low loss, reliable variable optical attenuators and 1×2 optical switches are disclosed hereinbelow.

Figure 9:
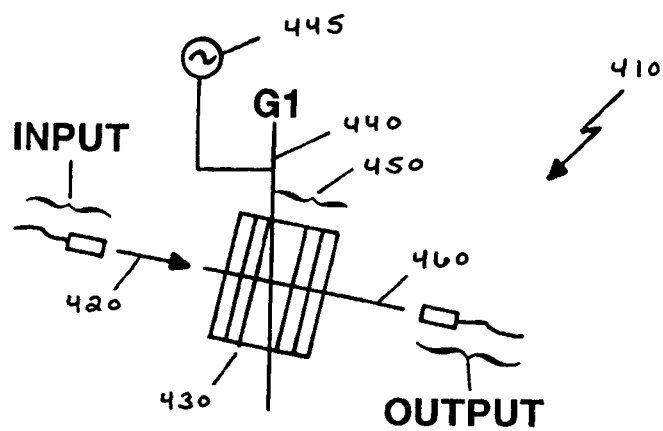
FIG. 9 is a pictorial, schematic representation of an embodiment of a variable optical attenuator of this invention.

FIG. 9 shows a pictorial, schematic representation of an embodiment of a variable optical attenuator (VOA) of this invention. The embodiment shown in FIG. 9 operates in a configuration hereinafter called the normally-off configuration. In one embodiment the input optical beam 420 is derived from a single-mode (SM) fiber that is coupled to a collimating lens. Other embodiments derive the input beam from collimated free space beams or collimated sources. The input optical beam 420 is a beam of arbitrary polarization. The beam 420 is received by (enters) a polarization separating sub-system 430 (also referred to as a polarization diversity filter, or a compensator), which separates the input optical beam 420 into a first optical beam of a first polarization and a second optical beam of a second polarization, the second polarization being distinct from the first polarization (in one embodiment, the two polarizations are s- and p components). The polarization separating sub-system 430 is capable of emitting a first emitted optical beam of the first polarization and a second emitted optical beam of the first polarization (in one embodiment, the emitted beams are p-polarized). The emitted first and emitted second optical beams constitute an input channel of the first polarization. One or more switchable volume diffraction gratings 440 (one in the embodiment shown in FIG. 9) are optically disposed to receive the input channel and are capable of providing a transmitted channel. The transmitted channel includes a first transmitted optical beam of the first polarization and a second transmitted optical beam of the first polarization. A polarization recombining sub-system 450 is optically disposed to receive the first transmitted optical beam of the first polarization and the second transmitted optical beam of the first polarization and is capable of recombining the first transmitted optical beam of the first polarization and the second transmitted optical beam of the first polarization into a final output beam 460 of combined polarization.

One embodiment of the switchable volume diffraction grating element utilized in the variable optical attenuators/ 1×2 switches of this invention is the switchable diffraction element (grating) such as that described in U.S. Pat. No. 5,771,320, herein incorporated by reference.

The following paragraphs are excerpted from the detailed description of U.S. Pat. No. 5,771,320, herein incorporated by reference.

The embodiments of the optical switching and routing systems described herein utilize volume phase diffraction gratings that permit switching of the incident energy between two or more orders. The primary mechanisms considered which permit this diffracted-order switching are electrical switching, optical switching, and polarization switching. The switched gratings can be optically switched, electrically switched, polarization switched, or switched based on other mechanisms. Currently it is preferred that electrical and polarization switching techniques are used with the present invention since they are extremely fast (switching times in the microsecond regime or faster). Electrical switching can be obtained in materials such as Polaroid DMP-128 photopolymer (as described below) or, for example, polymer dispersed liquid crystals. So as to provide an example of a switching mechanism, one of the electrical switching techniques is described below. Further, switching to intermediate diffraction efficiency status permits switching of a given input signal to more than one output channel ("fan out" as opposed to "one to one" switching).

Recently it has been demonstrated in the literature that high efficiency volume diffraction gratings which are recorded in permeable media, such as the DMP-128 photopolymer manufactured by Polaroid Corporation, Cambridge, Mass., can be made to be rapidly switchable between high and low diffraction efficiency states under electric control by imbibing the structure with nematic liquid crystals. In this technique the crystals are rotated by the applied electric field and their refractive index is switched between ordinary and extraordinary values. By choosing the materials so that one of these switchable values matches that of the host grating material, the grating modulation is effectively switched "off" and "on," thus switching the diffraction efficiency of the gratings and toggling the diffracted beam between the 0 and first diffracted order. It should also be appreciated that the switching systems described above use switched transmission diffractive gratings.

The embodiments of the optical switching and routing systems described in U.S. Pat. No. 5,771,320 utilize volume phase diffraction (holographic) gratings that permit switching of the incident energy between two or more orders. The primary mechanisms considered which permit this diffracted-order switching are electrical switching, optical switching, thermal switching, and polarization switching. The switched gratings can be optically switched, electrically switched, polarization switched, or switched based on other mechanisms. Currently it is preferred that electrical and polarization switching techniques are used with the present invention since they are extremely fast (for example, switching times in the microsecond regime). Electrical switching can be obtained in materials such as liquid crystal-imbibed Polaroid DMP-128 photopolymer (as described below) or, for example, polymer dispersed liquid crystals. So as to provide an example of a switching mechanism, one of the electrical switching techniques is described below. Further, switching to intermediate diffraction efficiency status permits switching of a given input signal to more than one output channel ("fan out" as opposed to "one to one" switching).

It has been previously demonstrated in the literature that high efficiency volume diffraction gratings which are recorded in permeable media, such as the DMP-128 photopolymer manufactured by Polaroid Corporation, Cambridge, Mass., can be made to be rapidly switchable between high and low diffraction efficiency states under electric control by imbibing the structure with nematic liquid crystals. In this technique the crystals are rotated by the applied electric field and their refractive index is switched between ordinary and extraordinary values. By choosing the materials so that one of these switchable values matches that of the host grating material, the grating modulation is effectively switched "off" and "on," thus switching the diffraction efficiency of the gratings and toggling the diffracted beam between the 0 and first diffracted order.

In some embodiments of the switchable volume diffraction grating, input beams of electromagnetic radiation with polarization in a predetermined plane of polarization are diffracted by the enabled grating. A substantially polarization insensitive variable optical attenuator (VOA)/1×2 switch can be obtained from the systems of this invention, even with polarization sensitive embodiments of the switchable gratings.

Embodiments of polarization separating/recombining sub-systems are described in U.S. patent application Ser. No. 10/668,975, filed on Sep. 23, 2003, incorporated by reference herein.

The following paragraphs are excerpted from the detailed description of U.S. patent application Ser. No. 10/668,975, incorporated by reference herein.

In order to better understand the present invention described below, it should be noted that certain terms used in the description of the invention have been used interchangeably.

In the following descriptions of the present invention, the terms such as "light" and "optical radiation" may be used interchangeably, and these terms both include electromagnetic radiation over the entire spectrum of wavelengths such as, for example, ultraviolet, visible, and infrared. Also, the term "optical", for example, as applied to components and systems, refers not only to optical components and systems, but also to electro-optical components and systems.

Furthermore, terms such as "beams" and "channels" may also be interchanged, in certain instances, based upon their usage as recognized in the art.

The optical switching/routing systems of this invention utilize polarization converter assemblies to provide switching and routing systems with effective coupling between a first and second router assemblies, and to provide polarization insensitive switching and routing systems.

Figure 1:
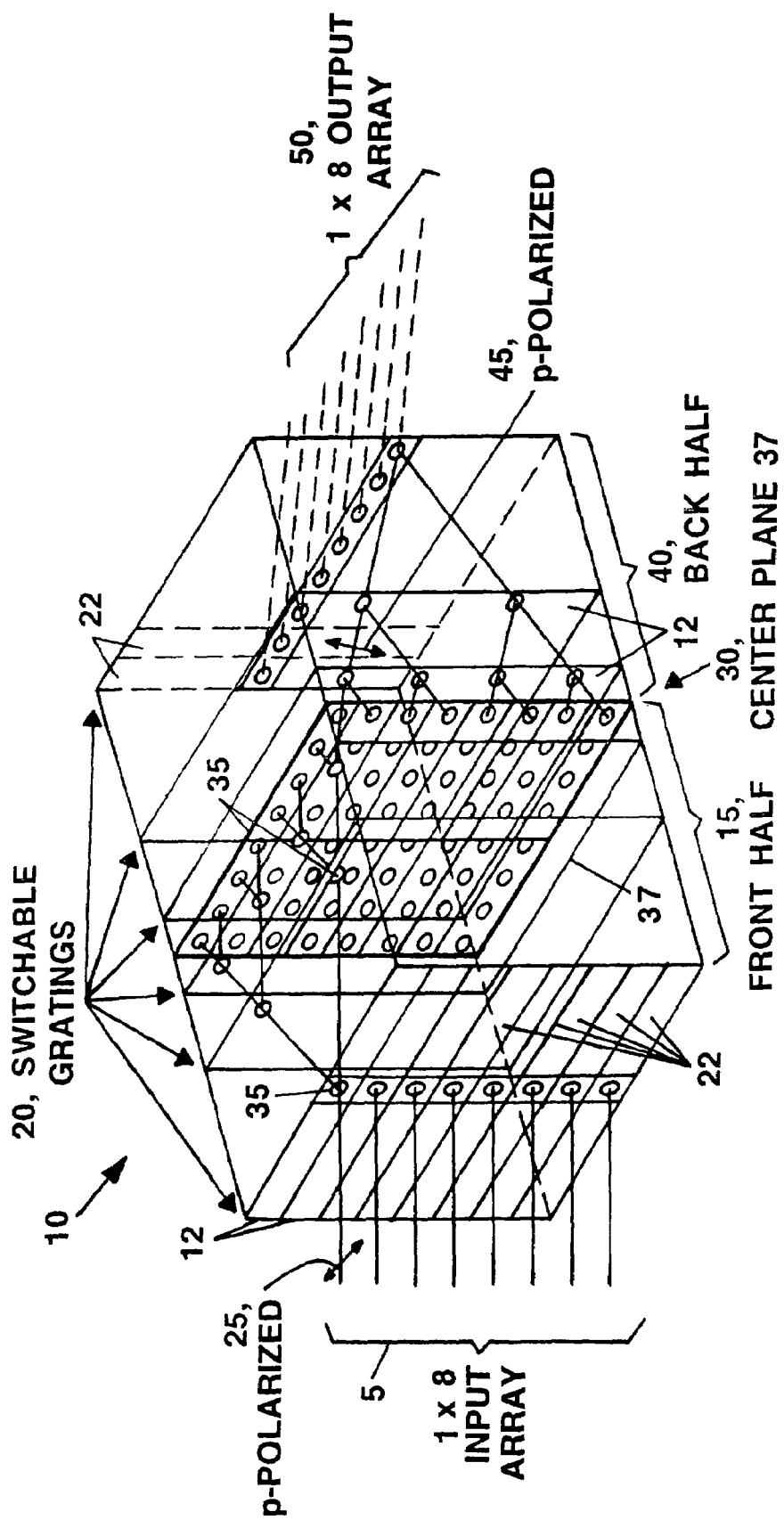
FIG. 1 is a pictorial, schematic representation of an embodiment of the optical switching/routing system of this invention.

FIG. 1 depicts a schematic representation of an embodiment of an optical switching/routing system 10 of this invention with effective coupling between first and second router assemblies (front half and back half) 15, 40. Referring to FIG. 1, the first router assembly 15 is capable of receiving one or more individual beams 5 of electromagnetic radiation with polarization in a predetermined plane of polarization 25. The first router assembly 15 has a predetermined orientation and includes grating means 20 defining several independently controlled segments for directing the one or more individual beams 5 of electromagnetic radiation from preselected locations 35 along the segments for input into a polarization converter assembly 30. The polarization converter assembly 30 is capable of receiving the one or more individual beams 5 of electromagnetic radiation from preselected locations 35 along the segments 20 of the first router assembly 15, and of rotating the predetermined plane of polarization 25 to produce an output plane of polarization 45. The second router assembly 40 being has an orientation different from the predetermined orientation of the first router assembly 15. The second router assembly 40 includes grating means 20 defining several independently controlled segments for receiving each of the individual beams 5 from the polarization converter assembly 30 and directing the individual beams 5 for output 50.

Embodiments of the router assemblies are described in U.S. Pat. No. 5,771,320, incorporated by reference herein. The gratings 20 are switchable gratings and the switching is controlled by control signals 12 (only two of which are shown). The gratings are separately switchable in segments 22 for each of the channels in the input array 5. This independent switching of each of the gratings 20 for each input channel can be accomplished by pixellating each of the gratings 20 into m stripe segments 22. In the embodiment shown in FIG. 1, the second router assembly 40, which is nearly identical in structure the first router assembly 15, is crossed in orientation with respect to the first router assembly 15. The segments 22 of the second router assembly 40 are rotated 90 degrees with respect to the segments 22 of the first router assembly 15.

During operation of the switching and routing system 10 of FIG. 1, control signals 12 effect the "on-off" operation of the gratings 20, thereby directing the input beams 5 of each channel to the desired output channels of output array 50. The first router assembly 15 contains n cascaded gratings 20, each of which is pixilated into m separately controllable segments 22. Thus there are n*m control signals 12 required to independently route each of the input beams 5 to its selected column in the central plane 37. The second router assembly 40 also needs m*n control signals 12 to route the selected beam from each column to the desired output channel. The total control line count for a general m channel to m channel switch for this embodiment is thus 2*m*n.

The embodiments of the optical switching and routing systems described in U.S. Pat. No. 5,771,320 utilize volume phase diffraction gratings that permit switching of the incident energy between two or more orders. The primary mechanisms considered which permit this diffracted-order switching are electrical switching, optical switching, and polarization switching. The switched gratings can be optically switched, electrically switched, polarization switched, or switched based on other mechanisms. Currently it is preferred that electrical and polarization switching techniques are used with the present invention since they are extremely fast (switching times in the microsecond regime or faster). Electrical switching can be obtained in materials such as Polaroid DMP-1 28 photopolymer imbibed with nematic liquid crystals or, for example, polymer dispersed liquid crystals. The gratings formed utilizing polymer dispersed liquid crystals or photopolymer imbibed with nematic liquid crystals are polarization sensitive gratings.

Referring again to FIG. 1, during operation of the optical switching and routing system 10 of this invention utilizing polarization sensitive gratings, control signals 19 effect the "on-off" operation of the gratings 20. Input beams 5 of electromagnetic radiation with polarization in a predetermined plane of polarization 25 are steered by the enabled segments 22 of gratings 20 to preselected locations on the output plane 37 of the first router assembly 15. When a particular grating segment 22 is "on," the beam incident on that segment is completely switched by diffraction with little or no loss from the incident beam to a diffracted beam traveling in a new direction. The steered beams 5 from the preselected locations on the output plane 37 of the first router assembly 15 are inputs to the polarization converter assembly 30. The polarization converter assembly 30 rotates the predetermined plane of polarization 25 into an output plane of polarization 45. The output plane of polarization 45 is chosen so that the beams 5 are effectively transmitted by the second router assembly 40. The beams 5 of electromagnetic radiation with polarization in an output plane of polarization 45 are steered by the enabled segments 22 of gratings 20 in the second router assembly 40 to an output location in output array 50.

Figure 2:
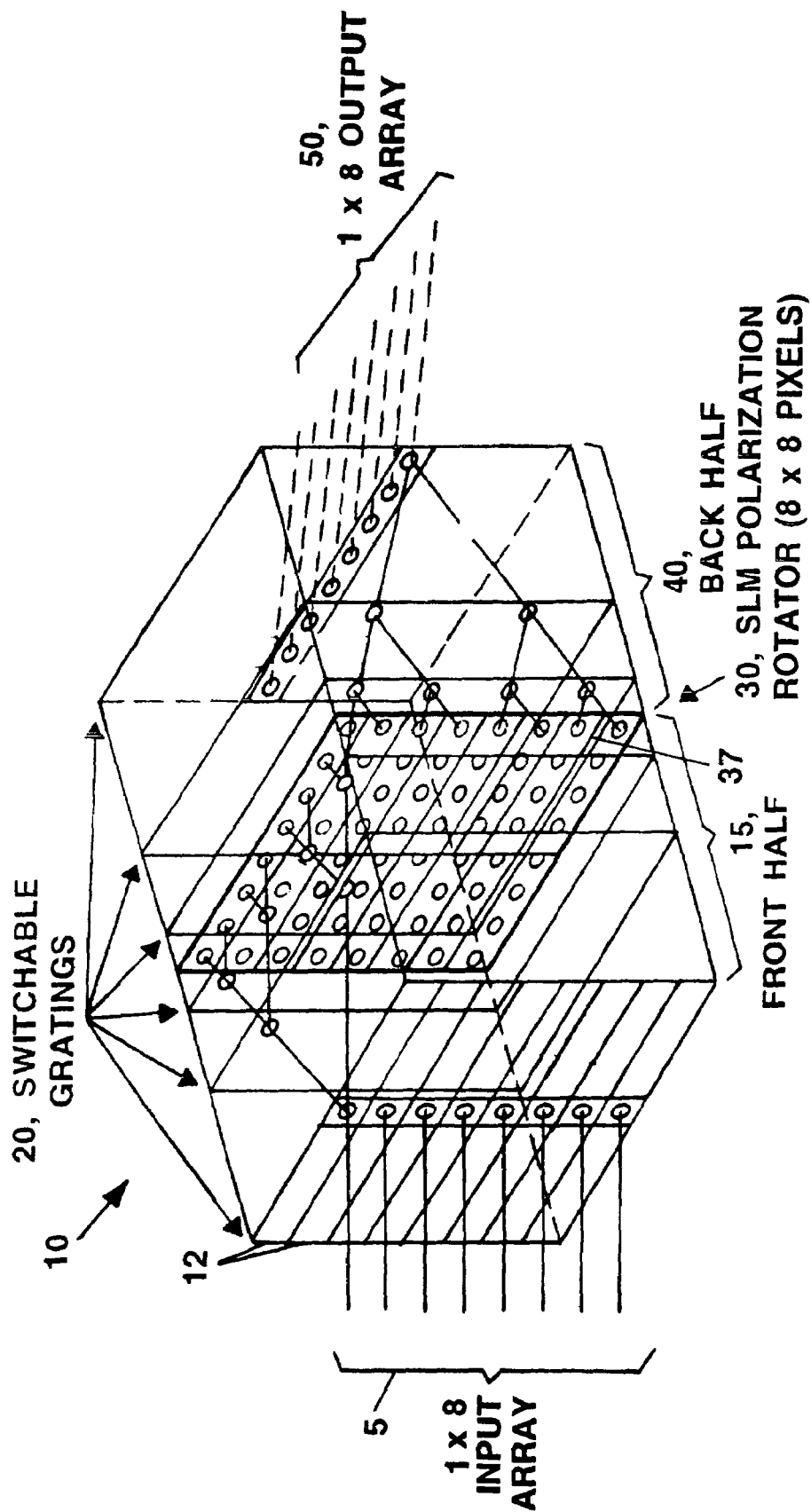
FIG. 2 is a pictorial, schematic representation of another embodiment of an optical switching/routing system of this invention.

FIG. 2 is a schematic representation of an embodiment of the optical switching/routing system of FIG. 1 in which the polarization converter 30 includes a liquid crystal spatial light modulator (SLM). In this embodiment, the SLM has two states. In one state, an SLM pixel rotates the polarization plane by 90°; in the other state, the polarization plane is not rotated. Exemplary embodiments are 2-D SLMs based on ferroelectric liquid crystals (such as those available from Displaytech), or SLMs based on nematic liquid crystals (such as those available from Meadowlark Optics). Other embodiments include an SLM based on a twisted nematic configuration. The SLM polarization converter 60 also includes steering gratings directly before and directly after the central plane SLM. In one embodiment, a first steering grating, disposed between the output plane 37 and the SLM, would steer beams 5 normal to the output plane 37 of the first router assembly 15. The second steering grating, disposed after the SLM, would steer the beams 5 in the input vertical plane of the second router assembly 40. The first steering grating ensures normal (perpendicular) incidence of the beams 5 onto the SLM. The steering gratings may be pixilated static gratings or switchable gratings.

Figure 3:
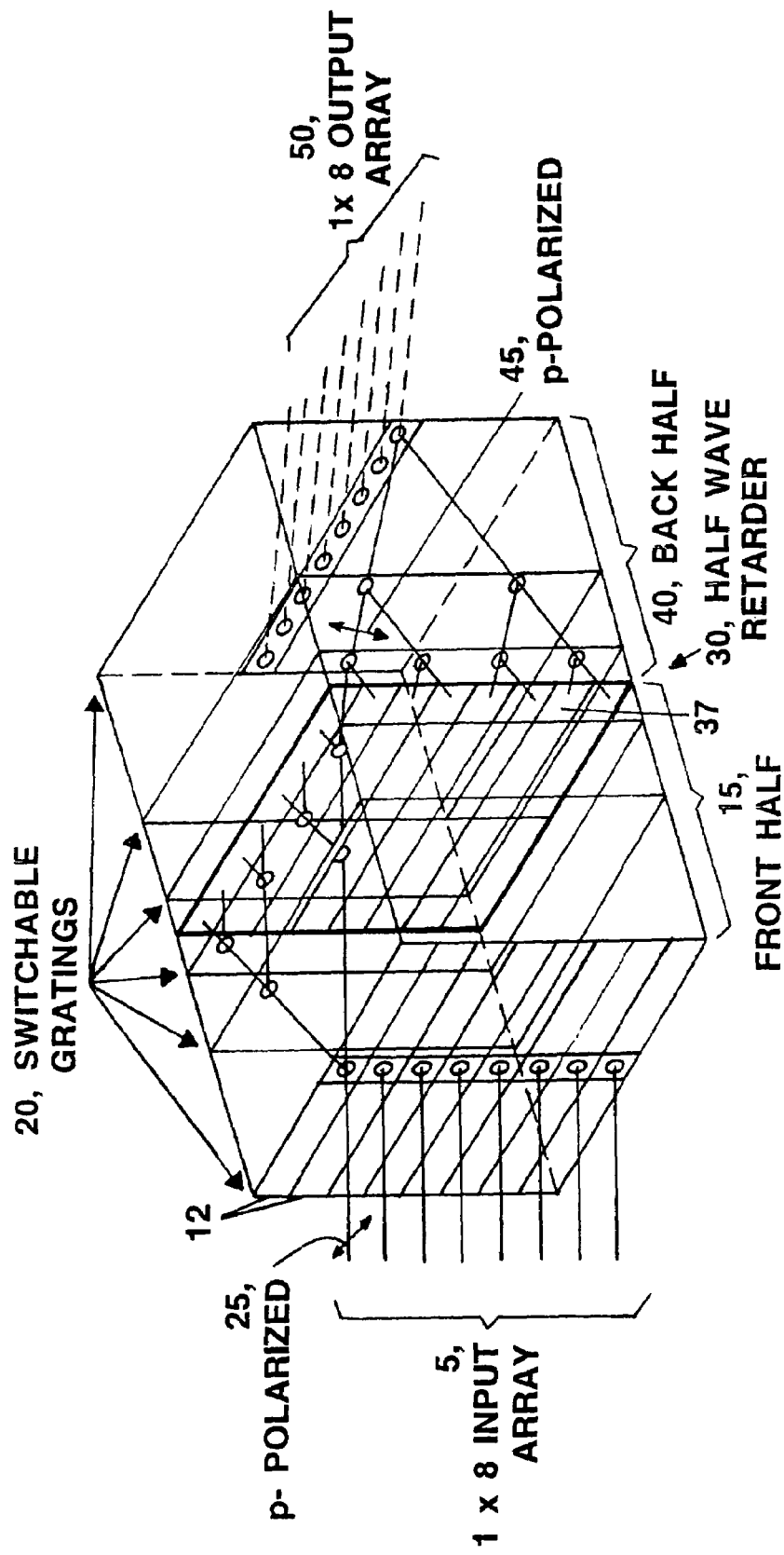
FIG. 3 is a pictorial, schematic representation of yet another embodiment of an optical switching/routing system of this invention.

FIG. 3 is a schematic representation of an embodiment of the optical switching/routing system of FIG. 1 in which the polarization converter 30 includes a half-wave retarder. In this embodiment, the polarization converter 70 includes a zero-order half-wave retarder that has its optic axis in a plane parallel to the output plane 37 of the first router assembly 15. The optic axis is oriented at 45° with respect to the polarization plane 25 of the incident beams. The polarization converter 70 also includes steering gratings directly before and directly after the central plane half-wave retarder. In one embodiment, a first steering grating, disposed between the output plane 37 and the half-wave retarder, would steer beams 5 normal to the output plane 37 of the first router assembly 15. The second steering grating, disposed after the half-wave retarder, would steer the beams 5 in the input vertical plane of the second router assembly 40. The first steering grating ensures normal (perpendicular) incidence of the beams 5 onto the half-wave retarder.

In one embodiment, half-wave retarders are comprised of anisotropic materials. In another embodiment, the half-wave retarder utilizes a solid twisted nematic film in the central plane. Such a solid twisted nematic film could include, but are not limited to, polymerizable nematic, or chiral nematic, liquid crystals. (Examples of half-wave retarders can be found in the products offered by Meadowlark Optics and Newport Research Corporation.) Other embodiments of half-wave retarders are within the scope of this invention.

Figure 4:
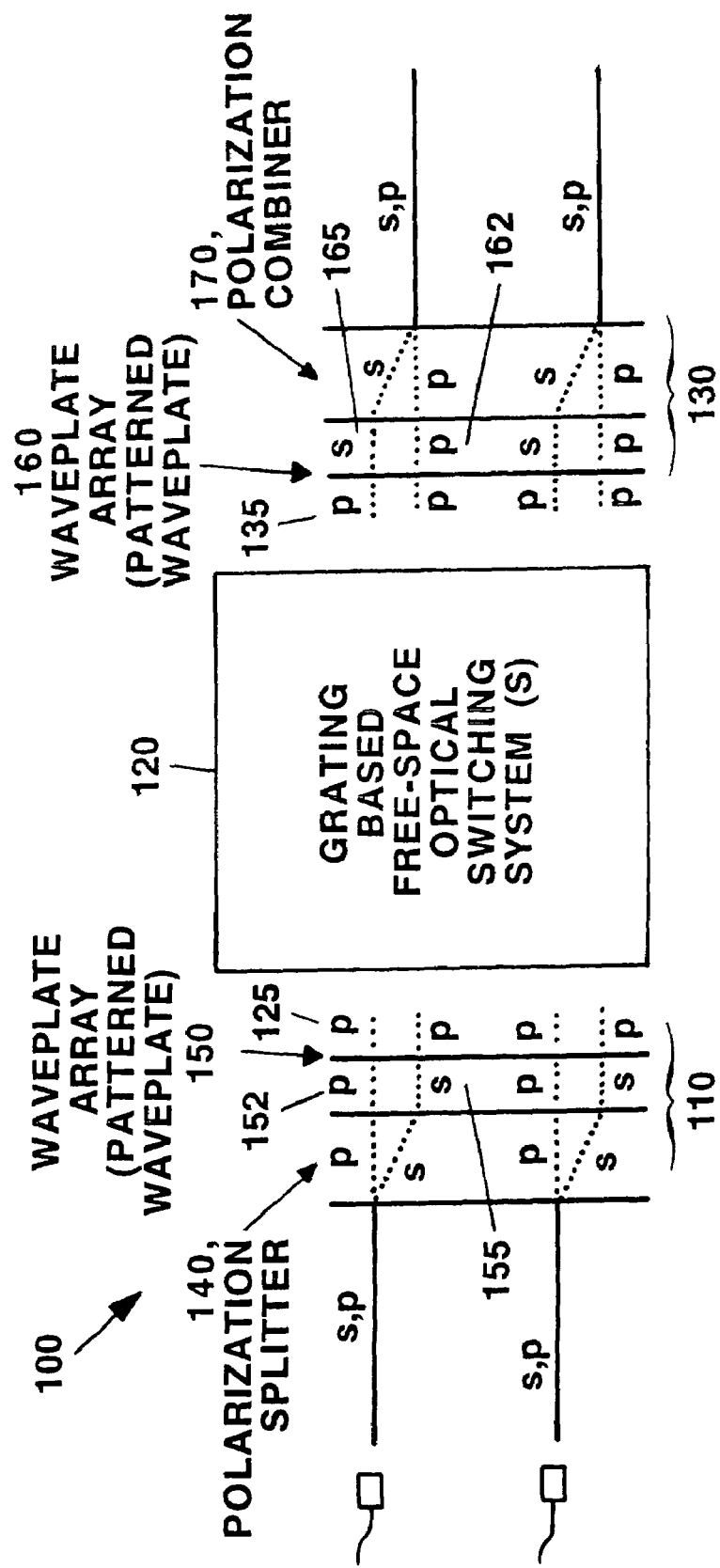
FIG. 4 is a schematic representation of an embodiment of a polarization insensitive optical switching/routing system of this invention.
Figure 5:
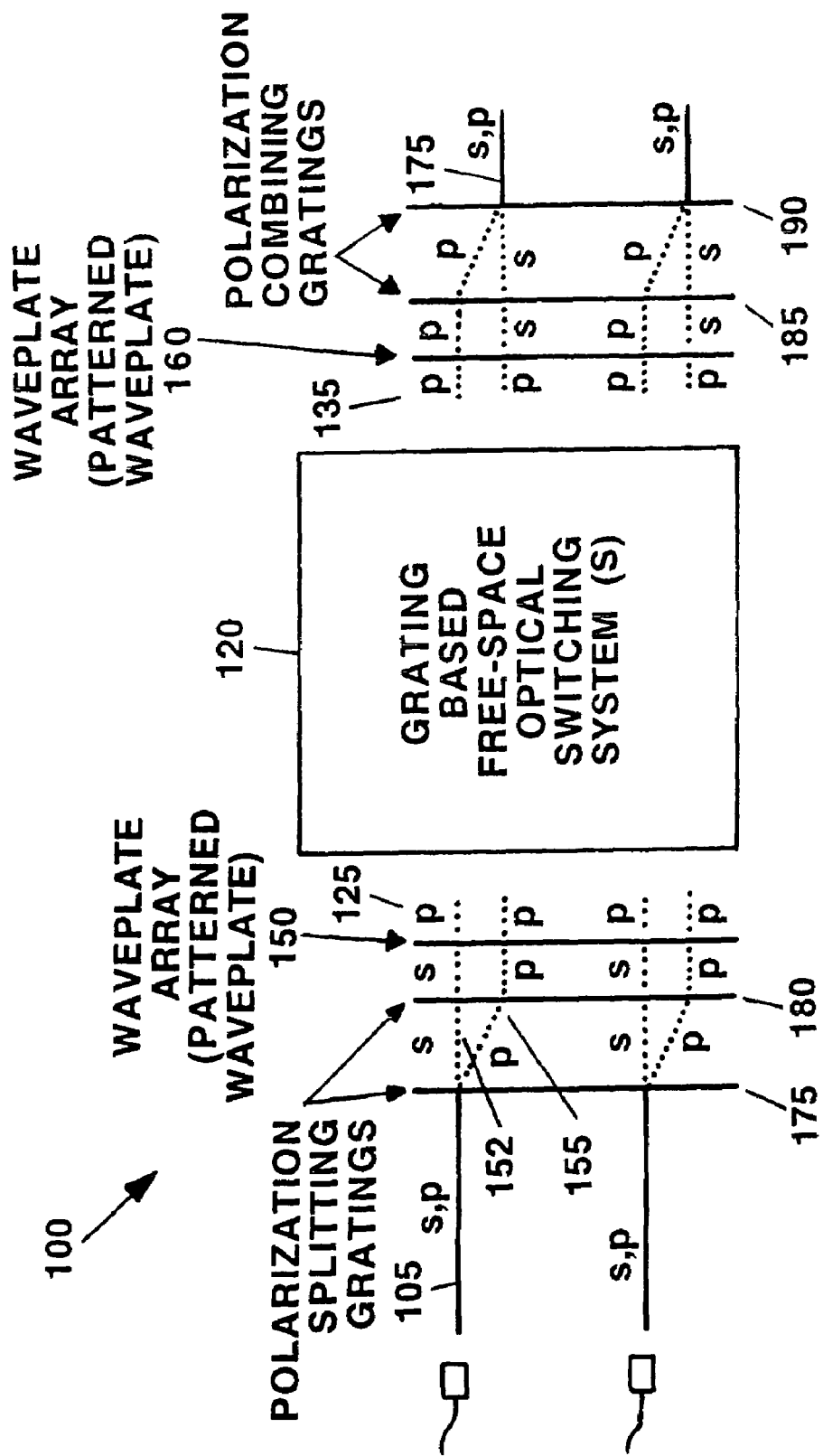
FIG. 5 is a schematic representation of another embodiment of the polarization insensitive optical switching/routing system of this invention.

A schematic representation of an embodiment of a polarization insensitive optical switching/routing system 100 of this invention is shown in FIG. 4. Referring to FIGS. 4 and 5, the polarization components are, as is usually done, defined with respect to the local interface. In an embodiment of the grating based switching/routing system shown in FIGS. 1, 2, and 3, if a pair of beams with "p" polarization constitute the input channel to the grating based switching/routing system, where the gratings diffract "p" polarized light when the gratings are "on", the polarization of the output channel of the first router assembly 15 is rotated ninety (90) degrees by the polarization converter assembly 30 and provided as input to the second router assembly 40. In this embodiment, the gratings (segments) of the second router assembly 40 are rotated 90 degrees with respect to the segments of the first router assembly 15. Since the gratings in the second router assembly 40 diffract "p" polarized light when the gratings are "on" and the polarization components are defined locally with respect to the grating, the polarization component of the output channels of the second router assembly 40 will be labeled as a "p" component although the polarization component of the output channels is rotated by 90 degrees with respect to the polarization component of the input channels to the first router assembly 15.

Referring to FIG. 4, the polarization insensitive optical switching/routing system 100 includes a polarization separating sub-system 110, a selectable switching/routing sub-system 120, and a polarization recombining sub-system 130. The polarization separating sub-system 110 includes a polarization splitter 140 and a patterned polarization converter 150. ("Patterned" as used herein includes a "tiled" polarization converter. A "tiled" polarization converter is one that has assembled from sub-units or components.) The patterned polarization converter 150 has an isotropic region 152 and a second region 155 such that an optical beam 105 with arbitrary polarization state incident on the polarization splitter 140 will exit the patterned polarization converter 150 as two beams with parallel polarization vectors 125.

The polarization recombining sub-system 130 includes a patterned polarization converter 160 and a polarization combiner 170. The patterned polarization converter 160 has an isotropic region 162 and a second region 165 such that two beams with parallel polarization vectors 135 incident on the patterned polarization converter 160 will exit the polarization combiner 170 as an optical beam 175 with arbitrary polarization state.

If selectable switching/routing sub-system 120 includes polarization sensitive gratings, the gratings operate on one component of polarization (labeled "p" in FIG. 4). In order to make the switching/routing system 120 function with the other component of polarization (labeled "s" in FIG. 4) or with light containing both components of polarization, the switching systems are placed between symmetric polarization splitter 110 and combiner 130 assemblies as shown in FIG. 4. Although "p" and "s" are used herein as polarization labels, it should be noted that "p" and "s", and "ordinary" and "extraordinary", as used herein refer to exemplary polarization labels and the methods of this invention are not limited to these exemplary cases. It should also be noted that the methods of this invention can be applied to, but are not limited to, orthogonal polarization components.

During operation of the system of FIG. 4, an optical beam 105 with arbitrary polarization state is incident on the polarization splitter 140. In one embodiment, the polarization splitter 140 includes a uniaxial crystal such as calcite, quartz, etc. The thickness of the splitter 140 is selected so that the s and p components are spatially separated into a pair of twin beams. The twin beams then encounter the patterned polarization converter 150 that rotates the s component beam into the p-polarized state. In one embodiment, the pattern is selected so as to leave the p-polarized beam in the p state. The two p-polarized twin beams 125 corresponding to each input beam 105 then propagate through the switching/routing system 120, and are routed accordingly. In one embodiment, the patterned polarization converter 150, 160 includes a polymerized twisted nematic rotator.

At the output of the switching/routing system 120, exiting twin beams 135 are then symmetrically recombined. In order to balance path lengths of the two component beams, the patterned polarization converter 160 is now aligned so that the beam that was transmitted through the splitter (undeviated) at the front of the system is now deviated symmetrically as shown in FIG. 4. The thickness of the combiner 170 is chosen so that the two polarization component beams 162, 165 are brought back together again and are spatially combined in an output optical beam 175 with arbitrary polarization state.

In another embodiment of the a polarization insensitive optical switching/routing system 100, shown in FIG. 5, polarization sensitive gratings 175, 180, 185, 190 are used to accomplish the split and combine functions. The polarization sensitive gratings 175, 180 are used to split and separate the s and p polarization components into twin, spatially separated beams 152, 155 as in FIG. 4. And as in FIG. 4, a patterned polarization converter 150 produces two p-polarized twin beams 125 corresponding to each input beam 105. The two p-polarized twin beams 125 corresponding to each input beam 105 then propagate through the switching/ routing system 120, and are routed accordingly. At the output of the switching/routing system 120, the exiting twin beams 135 are then symmetrically recombined. The patterned polarization converter 160 operates as in FIG. 4. The polarization sensitive gratings 185, 190 spatially combine the two polarization component beams 162, 165 into the output optical beam 175 with combined (arbitrary) polarization state. Also as in FIG. 4, the recombination is symmetric so as to balance the path lengths of the two twin polarization component beams.

In one embodiment of the polarization insensitive optical switching/routing system 100, the optical switching/routing system of FIG. 1 is utilized as the selectable switching/ routing sub-system 120. In the embodiment of this invention in which the switching/routing system 120 includes a pixilated switchable grating, such as that shown in FIG. 1, the two p-polarized twin beams 125 are typically switched/ routed together (in tandem) in the same manner a single beam (channel) is switched through the switching/routing system 120.

It should be noted that the polarization separating/recombining sub-systems could be considered as a separate optical systems (also referred to as a polarization diversity filters). The polarization sensitive grating based polarization diversity filters (PDF) have cost advantages (in particular at large aperture). Multi channel capabilities (for example, a single large aperture grating can accept many parallel input channels) absent in prior art splitters, such as anisotropic and micro-optic polarization beam splitters, can be achieved in polarization sensitive grating based PDFs. Since only two components are required and these two components are readily alignable, the polarization sensitive grating based PDFs have alignment advantages over multi-element PDFs such as micro-optic polarization beam splitters.

In one embodiment, shown in FIG. 5, a pair of identical polarization sensitive volume holographic diffraction gratings 175, 180, such as described in U.S. Pat. Nos. 5,771,320, and 5,692,077, or made with PDLC, with a photo-polymer such as Polaroid DMP-128, or with dichromated gelatin, which diffract only "p" polarized light and transmits "s" polarized light are used as polarization splitting gratings. The first grating diffracts the "p" polarized light while the "s" polarized light is transmitted undiffracted.

The second grating subsequently diffracts the "p" component in order to render it parallel to the undiffracted "s" polarization component. The separation between the two gratings is sufficient to spatially separate the "s" and "p" component beams. It should be noted that the diffraction angle (and accordingly the spatial frequency) of the two grating can be chosen to optimize the contrast in the polarization splitting.

For the polarization sensitive grating shown in FIG. 5, the diffraction efficiency of the "p" polarization is maximized and the diffraction efficiency for "s" polarization is simultaneously minimized (thus, the "s" polarized beam is transmitted). It should be noted that in another embodiment (not shown), the "s" polarization is maximized and the diffraction efficiency for "p" polarization is simultaneously minimized. The polarization combining performed by the polarization combining gratings 185, 190 is symmetrical to the operation of the polarization splitting gratings 175, 180. The embodiment shown in FIG. 5 results in an optical path balanced system and substantially reduces the temporal chromatic dispersion effects.

Figure 6A:
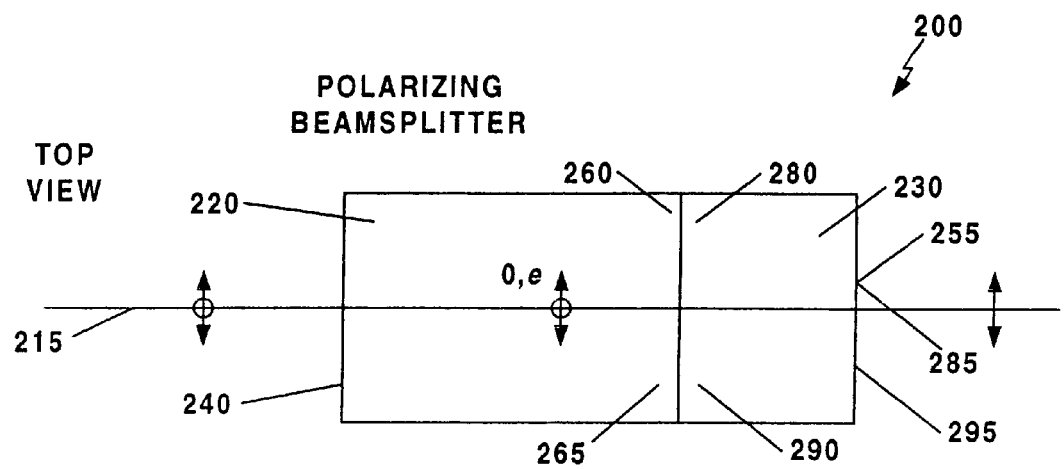
FIG. 6a is a top view of a schematic representation of an embodiment of a polarization converting system of this invention.
Figure 6B:
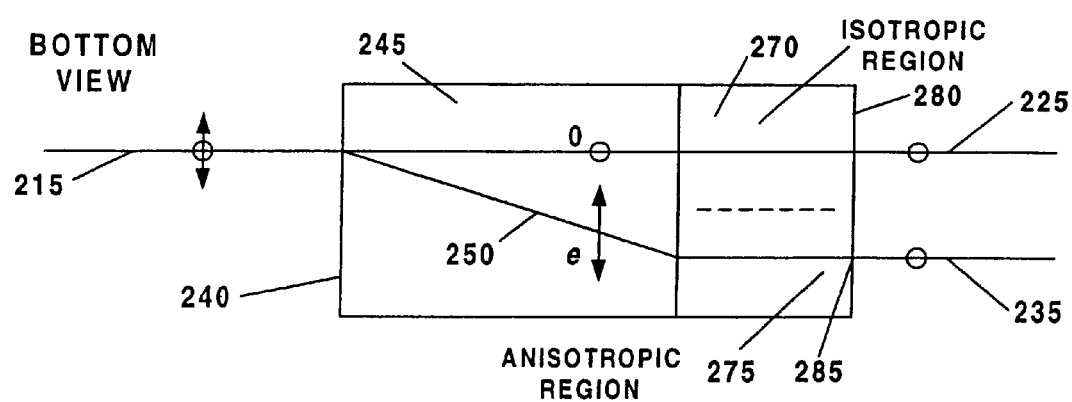

A schematic representation of an embodiment of a polarization converting system 200 (patterned polarization converter) of this invention, which can be utilized as the patterned polarization converter 150, 160 of FIGS. 4, 5, is shown in FIGS. 6a, 6b. A detailed description of the polarization converting system 200 and methods for fabricating one embodiment are given herein below.

Referring to FIGS. 6a and 6b, the polarization converting system 200 of this invention includes a polarizing beam-splitter 220 and a patterned polarization converter 230, both of which are more fully described below. During use, as seen in FIGS. 6a and 6b, a substantially collimated optical beam 215 with arbitrary polarization state is incident on the system 200 through the beam-splitter light receiving surface 240 and exits as two beams 225, 235 with parallel polarization vectors, as shown in FIGS. 6a and 6b. The beam-splitter light emitting surface 255 has two areas—a first area 260 and a second area 265. The polarization beam-splitter separates the received beam of light 215 into a beam of light 245 of a first polarization (also called the ordinary polarization) emitted from the first area 260 and another beam of light 250 of a second polarization (also called the extraordinary polarization) emitted from the second area 265.

In one embodiment, the polarization converter 230 of this invention has a first isotropic region 270 and a second region 275. When a substantially collimated optical beam 215 with arbitrary polarization state is used as input to the polarizing beam-splitter 220, the beam of light of the first (the ordinary polarization) polarization 245 enters the isotropic region 270, at normal incidence, through the first region light receiving surface 280 and exits, as a beam 225 of the same first polarization, through the first region light emitting surface 285. Thus, transport through the isotropic region leaves the polarization unchanged. The output beam 225 has the same polarization as input beam 245.

The beam of light of the second (the extraordinary polarization) polarization 50 enters the second region 275, at normal incidence, through the second region light receiving surface 290 and exits, as a beam 235 of the first polarization, through the second region light emitting surface 295. Transport through the second region rotates the polarization of the incoming beam 250 producing an output beam 235 of the same polarization as the beam 225 emitted from the isotropic region. Both beams 225 and 235 exit the polarization converter 230 normal to the surface.

The first region light receiving surface 280 is substantially disposed on the first area 260 of the beam-splitter light emitting surface 255 by being in contact with or secured on area 260 by means of any conventional optically appropriate adhesive. The second region light receiving surface 290 is substantially disposed on the second area 265 of the beam-splitter light emitting surface 255 by also being in contact with or secured on area 265 by means of any conventional optically appropriate adhesive.

While the above embodiment is described in terms of a substantially collimated optical beam with arbitrary polarization state, containing both ordinary and extraordinary polarization components, incident on the beam-splitter light receiving surface, the embodiment could be also utilized for the case where the incident substantially collimated optical beam contains only ordinary or extraordinary polarization. In this case, one of the two beams entering the polarization converter has null amplitude and the same beam also has null amplitude upon exiting the polarization converter.

Although not limited thereto, anisotropic crystalline materials, such the "walk-off polarizer" offered by Optics for Research, Inc. of Caldwell, N.J., can be utilized for the polarizing beam-splitter. It should be noted that other configurations are possible utilizing one or more sub-elements. For example, micro-optic polarizing beam splitters (including polarizing cube beam splitters) can also be utilized.

In another embodiment of the polarization converting system of this invention, a pair of polarization sensitive gratings is used as the beam splitter.

Possible, but not limited to, embodiments of the second region 275 of polarization converter 230 are a half-wave retarder and a twisted nematic polarization converter. As shown in FIGS. 6a and 6b, the polarization converter 230 is utilized at normal incidence.

For a better understanding of the present invention, reference is now made of the following analysis. More specifically, bandwidth considerations can be used to compare the half-wave retarder and a twisted nematic embodiment. For linearly polarized light incident on a half-wave retarder with its plane of polarization at 45° with respect to the optic axis (of the retarder), the optical power $P_m$ still remaining polarized parallel with the incident light is given by $$P_m = \cos^2\left(\frac{m\pi}{2}\frac{\lambda_c}{\lambda}\right), \quad (1)$$

where, $\lambda_c$ is the center wavelength of the incident light, $\lambda$ is the wavelength of incident light and m is the order of the retarder, with m=1,3,5 . . . for zero-, first, second-order waveplates etc. Note that $\lambda_c=2\Delta nd$, where $\Delta n$ is the retarder birefringence and d is the retarder thickness. It is apparent from Eq. (1) that the zero-order half-wave retarder (i.e. m=1) has the broadest bandwidth. In addition, it is the least sensitive to angle of incidence variations. The extinction ratio, or contrast, of the retarder may be defined as follows:

$$\gamma_m = 10 \log P_m. \quad (2)$$

Next, consider the 90° twisted nematic (TN) polarization converter. The optical power at the output of a 90° TN with polarization plane parallel to that of the incident light is given by $$P_q = \frac{\sin\left[\frac{\pi}{2}\sqrt{1+\left(\frac{\lambda_c}{\lambda}\sqrt{4q^2-1}\right)^2}\right]}{1+\left(\frac{\lambda_c}{\lambda}\sqrt{4q^2-1}\right)^2}, \quad (3)$$

where $\lambda$ is the design wavelength and q is referred to as the order of the TN; q=1,2,3 . . . refer to first-, second-, third-minimum TNs etc (as shown by C. H. Gooch and H. A. Tarry, J. Appl. Phys. D 8, 1575 (1975)). The center wavelength of the TN rotator is given by $\lambda_c=2(\Delta nd)/(4q^2-1)$, where $\Delta n$ is the nematic birefringence and d is the TN film thickness. In the case of the TN, the first-minimum TN has the broadest spectral bandwidth. The extinction ratio, or contrast, of the TN is written analogously with Eq. (2).

Figure 7:
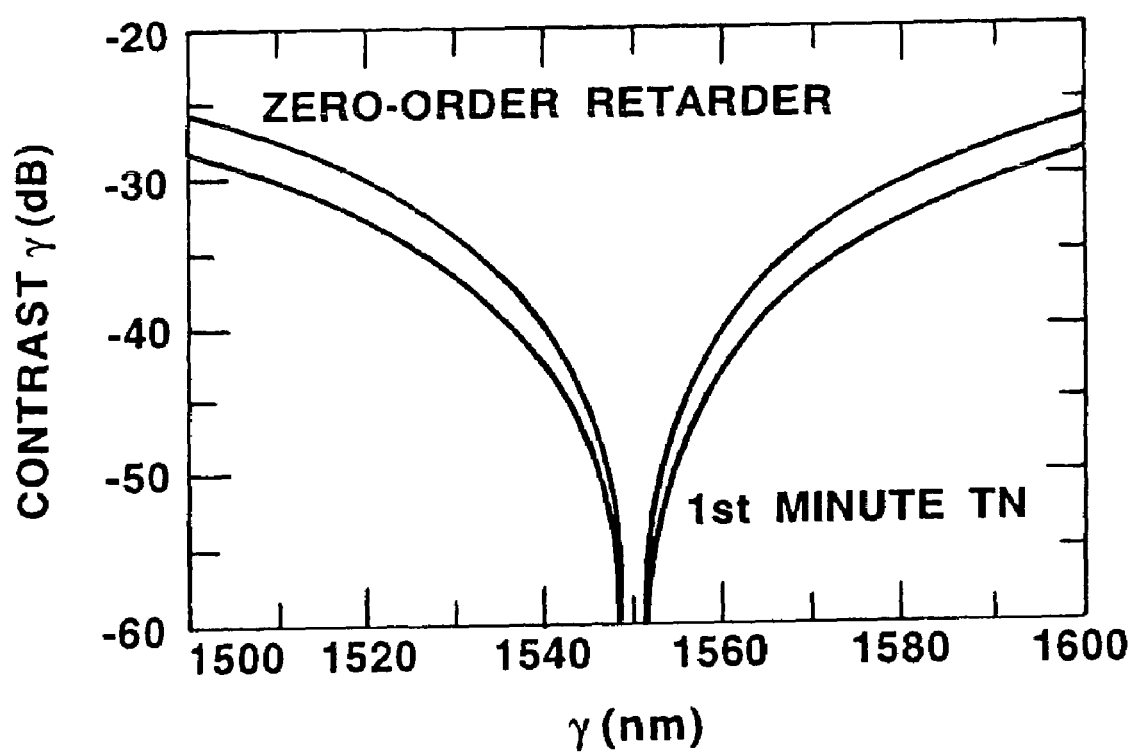
FIG. 7 is a graphical representation of a comparison of contrast for two embodiments of a polarization converter utilized in an embodiment of the polarization converting system of this invention.

FIG. 7 is a graphical representation of the contrast of the zero-order retarder and the first-minimum TN as a function of wavelength for $\lambda_c=1550$ nm. As can be seen from FIG. 7, the bandwidth of the first-minimum TN is broader than that of the zero-order retarder.

UV-curable nematic (N) or chiral nematic (N*), such as the RM (reactive mesogens) line of UV-curable nematics from EM Industries of Hawthorne, N.Y., could be used to construct the patterned polarization converter 230. The N material could be used to construct retarder-based rotators, and the N or N* material could be used to make the TN rotators.

Figure 8:
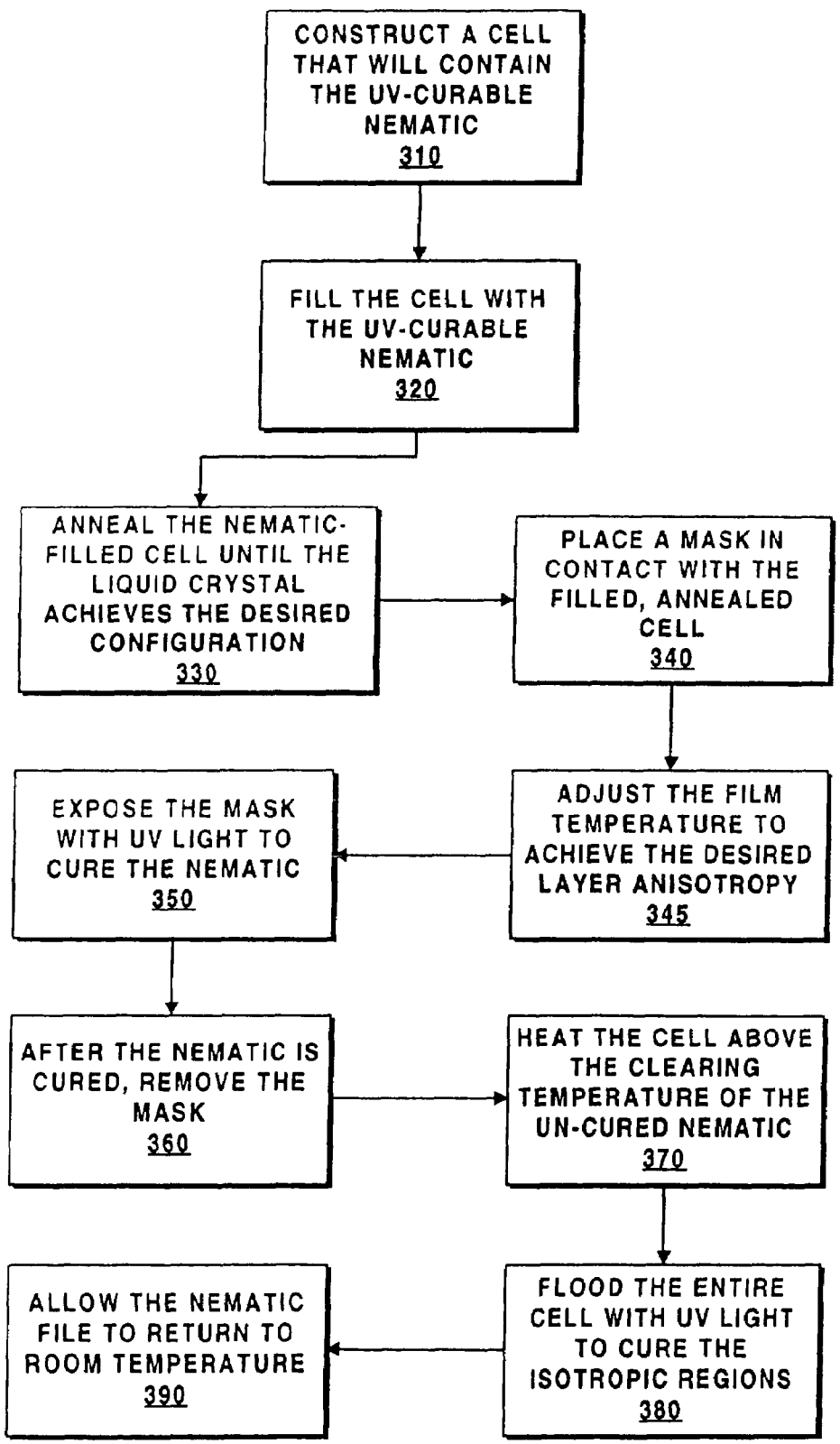
FIG. 8 is a flowchart of an embodiment of the method for fabricating a polarization converter of this invention.

FIG. 8 depicts a flowchart of an embodiment of the method for fabricating an embodiment of the polarization converter 230. Referring to FIG. 8, first, a cell (also referred to as a receptacle) is constructed to contain and align the UV-curable nematic (step 310, FIG. 8). The cell will generally consist of two substrates separated by appropriately sized spacers. The inner substrate surfaces will be coated with an alignment layer that aligns the nematic along a desired direction. In the case of the retarder, the alignment direction of the top and bottom substrates is the same; for the TN, the alignment directions of the top and bottom substrates are perpendicular. A suitable alignment layer that could be used is a polyimide film provided by Brewer Science (Rolla, Mo.) that contains mechanically-sculpted furrows to align the nematic directors. For example, polyimide SE812 (sold by Brewer Science) is spin-coated onto clean glass substrates to about 1-μm thickness, baked, then mechanically rubbed with a soft cloth. Nematic molecules align on such a polyimide layer, parallel to the rubbing direction.

Next, the cell is filled with the UV-curable nematic (step 320, FIG. 8). Filling may take place via capillary action; heating the cell may be necessary if the nematic materials are viscous. Alternatively, the nematic material may be heated on a single substrate that has spacers dispersed on it. A second substrate may be placed on top of this to create a nematic sandwich when the nematic is in the liquid state. Alternatively, the nematic may be solvent-cast onto a single substrate, as described, for example, in U.S. Pat. No. 5,926,241, issued to William J. Gunning, III on Jul. 20, 1999 (see, specifically, col. 6, lines 6-13).

The nematic-filled cell is annealed (step 330, FIG. 8) until the liquid crystal achieves the desired configuration dictated by the alignment layers on the substrates: e.g. planar or TN.

A mask is placed in contact with the filled, annealed cell so that the open areas define where the polarization rotation regions of the film shall be (step 340, FIG. 8). The film temperature is adjusted to achieve the desired layer anisotropy (step 345, FIG. 8), as determined using an optical measurement. In this step, the nematic birefringence Δn is thermally tuned after it is introduced into a cell with fixed thickness d. Note that the polarization state of an optical beam exiting the polarization converter depends on the quantity Δn·d/λ for both the half-wave retarder and twisted nematic configurations where λ is the wavelength of the optical beam.

The mask is, then, exposed with UV light that is effective for curing the nematic (step 350, FIG. 8). After the nematic is cured, the mask is removed (step 360, FIG. 8) and the cell is heated above the clearing temperature of the un-cured nematic (step 370, FIG. 8). The unexposed areas will then become isotropic; when this state has been achieved, the entire cell is flooded with UV light to cure the isotropic regions (step 380, FIG. 8). After exposure, the nematic film is allowed to return to room temperature (step 390, FIG. 8).

It should be noted that the although the above described embodiments have been described in terms of polarization rotation, other polarization conversion mechanisms are also within the scope of this invention. It should also be noted that although the embodiments of the polarization converter of this invention described above include a first isotropic region and a second polarization converting region, polarization converters including two polarization converting regions are also within the scope of this invention.

It should be further noticed that although the embodiment of the polarization insensitive switching/routing system of this invention described above includes a patterned polarization converter having an isotropic region and a polarization converting region, polarization insensitive switching/routing system including other polarization converters having two polarization converting regions are also within the scope of this invention.

An embodiment of a polarization insensitive switching/routing system of this invention including a polarization separating sub-system being capable of separating an input optical beam into a first optical beam of a first polarization and a second optical beam of a second polarization and emitting a first emitted optical beam of a third polarization and a second emitted optical beam of the third polarization, wherein the selectable switching/routing sub-system is capable of switching/routing the first emitted optical beam and the second emitted optical beam to an output channel of a fourth polarization, the output channel constituting a pair of output beams of said fourth polarization, and wherein the polarization recombining sub-system is capable of recombining the pair of output beams of the fourth polarization into a final output beam of combined polarization, is also within the scope of this invention. In such an embodiment, the polarization converters in either the polarization separating sub-system or the polarization recombining sub-system (or both) could include two polarization converting regions.

It should be noted that, although the invention is described above in terms of an embodiment where the two beams with parallel polarization vectors exiting the polarization converter have ordinary polarization, other embodiments are possible. For example, an embodiment in which the two beams with parallel polarization vectors exiting the polarization converter have extraordinary polarization is also possible.

As described in U.S. patent application Ser. No. 10/668,975, one embodiment of the polarization separating/recombining sub-system includes a polarizing beam-splitter and a patterned polarization converter. Other embodiments can also be utilized in the present invention.

During operation of the normally-off configuration of the embodiment shown in FIG. 9, in the off-state (i.e. where the grating 440 is diffracting or "on") the grating 440 diffracts light into the first-order with high diffraction efficiency, and very little light propagates to the VOA output 460. In the on-state (i.e. where the grating 440 is non-diffracting or "off"), the optical beam propagates through the grating 440 with very little loss and eventually, exits the VOA to the output 460. Since the diffraction efficiency of a switchable transmission volume grating varies continuously with applied voltage, the output optical power of the VOA of this invention is therefore continuously variable.

A common mode for switchable gratings fabricated using PDLC materials is to be diffracting when un-powered and non-diffracting when powered. For VOAs, it is often important to know the state of the devices in case of a power failure. If a VOA of FIG. 9 was made using such a grating, a lack of electrical power would leave the grating in a diffracting state, with little or no optical power transmitted to the output, and thus this configuration has been termed a "normally-off" configuration. It should also be noted that it is also possible to fabricate switched gratings, including PDLC switched gratings, so that they are non-diffracting without applied electrical power, and diffracting when powered. When this alternative type of switched grating is used with the configurations of this invention, the sense of "normally-off" and "normally-on", as used herein, are reversed.

It should be noted the voltage is only one embodiment of the means for controlling the switching of the switchable grating 440. Other embodiments exist for optical switching and for polarization switching.

It should also be noted that for the VOA configuration of FIG. 9, additional switched gratings 440 may be cascaded and simultaneously switched to partial diffraction efficiencies in order to extend the depth of available attenuation, if desired.

Figure 10A:
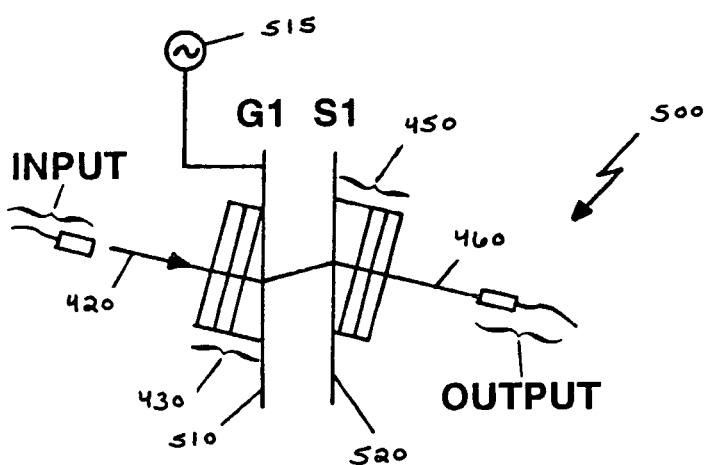
FIGS. 10a-10b are pictorial, schematic representations of another embodiment of a variable optical attenuator of this invention.
Figure 10B:
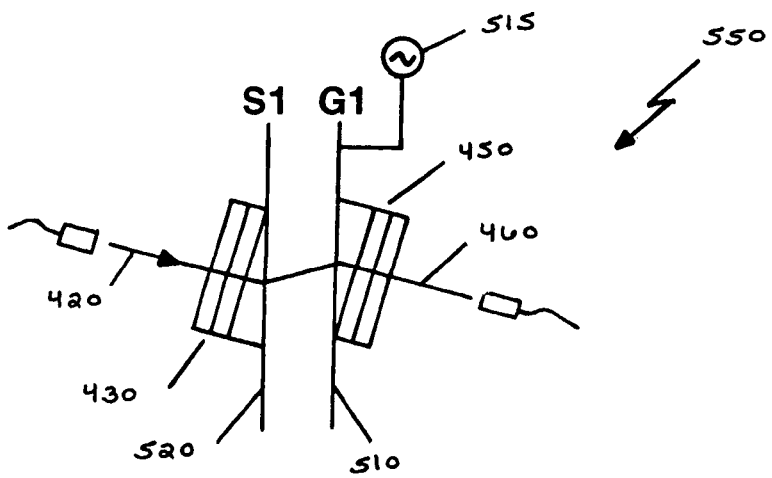

Shown in FIGS. 10a-10b are pictorial, schematic representations of other embodiments of a variable optical attenuator of this invention. FIG. 10a shows an embodiment of a variable optical attenuator of this invention including a polarization separating sub-system 430, a switchable volume diffraction grating 510, a static grating 520, and a polarization recombining sub-system 450. The static grating 520 can be, in one embodiment, a volume diffraction grating that is non-switchable.

The configurations of the embodiments shown in FIGS. 10a and 10b typically operate as "normally-on" configurations. Again, this nomenclature is based on the assumption of using common switched gratings 510 that are diffracting with no switching power applied, and non-diffracting when power is applied. The input optical beam 420 is a beam of arbitrary polarization. The beam 420 is received by (enters) a polarization separating sub-system 430 (also referred to as a polarization diversity filter, or a compensator), which separates the input optical beam 420 into a first optical beam of a first polarization and a second optical beam of a second polarization, the second polarization being distinct from the first polarization. The polarization separating sub-system 430 is capable of emitting a first emitted optical beam of the first polarization and a second emitted optical beam of the first polarization. The emitted first and emitted second optical beams constitute an input channel of the first polarization.

In the normally-on configuration of FIG. 10a, the input channel encounters the switchable volume diffraction grating 510 and is diffracted into the first-order when no voltage is applied across the grating. The input channel is then diffracted to the polarization recombining sub-system 450 by the static grating 520. The diffracted channel includes a first transmitted optical beam of the first polarization and a second transmitted optical beam of the first polarization. A polarization recombining sub-system 450 is optically disposed to receive the first transmitted optical beam of the first polarization and the second transmitted optical beam of the first polarization and is capable of recombining the first transmitted optical beam of the first polarization and the second transmitted optical beam of the first polarization into a final output beam 460 of combined polarization. When an appropriate voltage (in the electrical switching embodiment) is applied across the switchable volume diffraction grating 510, the input channel is transmitted (not diffracted) through switchable grating 510 and is not coupled into the output at the location shown in FIG. 10a. Since the diffraction efficiency of a switchable transmission volume grating varies continuously with applied voltage, varying the voltage of the control signal on switchable grating 510 varies the percentage of the optical power of the input channel that is diffracted to the output 460, and therefore the output optical power of the VOA of this invention is continuously variable.

It should be noted that embodiments operating in the normally-off configuration are also possible. For example, if a switchable grating that is transmitting with no applied power (and diffracting with applied power) is used as grating 510 in FIG. 10a, the configuration will operate as normally-off.

It should be noted that since the switchable gratings can be optically switched, electrically switched, polarization switched, or switched based on other mechanisms, the switching controls (voltage, or optical or polarization control) are means for varying the diffraction efficiency of the switchable gratings.

Shown in FIG. 10b is an embodiment of the VOA system of this invention in which the input channel encounters the static grating 520 first and then encounters the switchable transmission volume grating 510. The operation of the VOA system of this invention shown in FIG. 10b is analogous to that of the VOA system of this invention in FIG. 10a.

It should also be noted that switchable gratings in addition to switchable gratings 510 could replace the static grating 520 in FIGS. 10a and 10b. This allows, for example, for additional degrees of attenuation of the input signal if required. For example, consider the configuration of FIG. 10a. If static grating 520 is replaced by a switchable grating, it can be set to a diffracting state and the operation of the VOA is as described above. However, if it is desired to heavily attenuate the output channel, both the switchable grating replacing static grating 520 and switchable grating 510 can be switched to non-diffracting states. In such a configuration, if the switchable gratings give a 25 dB contrast between diffracting and non-diffracting states, switching both gratings can provide a roughly 50 dB optical attenuation level to the output. This approximately doubles the dBs of attenuation available by switching only a single grating.

Figure 11:
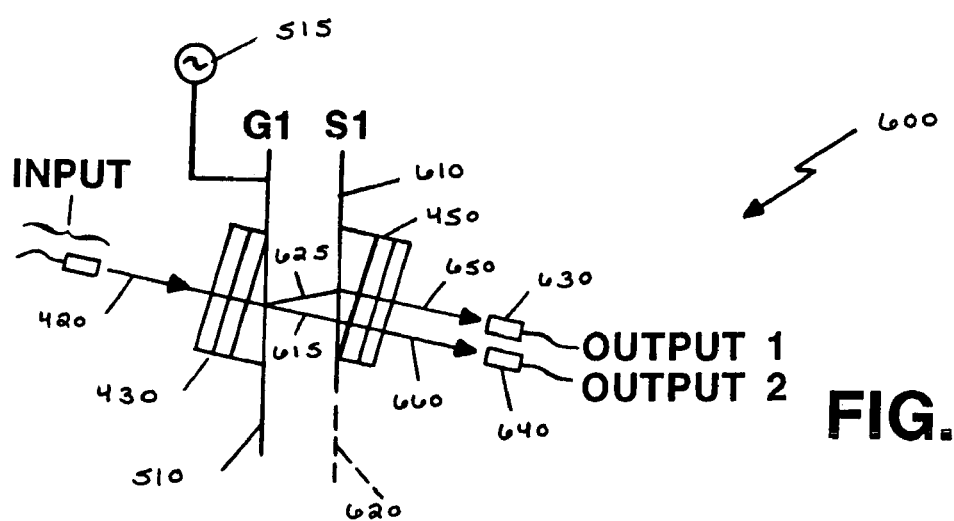
FIG. 11 is a pictorial, schematic representation of an embodiment of a 1×2 optical switch of this invention.

FIG. 11 shows a pictorial, schematic representation of an embodiment 600 of a 1×2 optical switch of this invention. The embodiment 600 of the 1×2 optical switch of this invention includes a polarization separating sub-system 430, a switchable volume diffraction grating 510, a static grating 610, and a polarization recombining sub-system 450. The static grating 610 includes a transparent region 620.

As in the embodiment of FIG. 10a, the input optical beam 420 is a beam of arbitrary polarization. The input beam 420 is received by (enters) the polarization separating sub-system 430 (also referred to as a polarization diversity filter, or a compensator), which separates the input optical beam 420 into a first optical beam of a first polarization and a second optical beam of a second polarization, the second polarization being distinct from the first polarization. The polarization separating sub-system 430 is capable of emitting a first emitted optical beam of the first polarization and a second emitted optical beam of the first polarization. The emitted first and emitted second optical beams constitute an input channel of the first polarization.

During operation of the 1×2 switch 600 of this invention, the input channel is incident on the switchable volume diffraction grating 510. The switchable grating 510 is set to either fully diffracting, fully transmitting, or some intermediate state of diffraction efficiency by the control 515 (voltage, in one embodiment). The fraction of the input channel that is undiffracted by switchable grating 510 is transmitted through switched grating 510 as transmitted beams 615. These beams are then incident on the transparent region 620 of static grating 610, where they are again transmitted as beams 615.

Similarly the fraction of the input channel that is diffracted by switchable grating 510 propagates as diffracted beams 625. These diffracted beams 625 are then incident on the static diffraction grating 610 and are diffracted by grating 610.

A polarization recombining sub-system 450 is optically disposed to receive the transmitted beams 615 and the diffracted beams 625. The transmitted beams 615 and the diffracted beams 625 each includes a first optical beam of the first polarization and a second optical beam of the first polarization. The polarization recombining sub-system 450 is capable of recombining the first optical beam of the first polarization and the second optical beam of the first polarization for each of beams 615 and 625 into two final output beams 660 and 650, respectively, of combined polarization. In one embodiment the 1×2 switch 600 of this invention includes two output beam ports 630, 640 (for example, two collimator/single mode fiber combinations). The two output beam ports 630, 640 receive two final output beams 650, 660 of combined polarization.

Since the diffraction efficiency of switchable diffraction grating 510 can be varied in a continuously varying manner using control 515 (electrical in one embodiment), variable amounts of the optical power in input 20 can be switched among outputs 630 and 640. This also includes the cases where substantially all of the input power is switched to either output 630 or to output 640. For the case where it is desired to switch all of the incident power to only one of the outputs at a time, it may be advantageous to replace static grating 610 and transparent region 620 by a single switched grating. In such a case, when it is desired to send all of the power to output 630, both switchable gratings could be set to fully diffracting. This would not only route substantially all of the power to the desired output, but any input signal leaking through the first switchable grating as undiffracted light, would be additionally attenuated from being crosstalk in the output 640 by diffraction from the second switchable grating. Similarly, when setting the switch to direct substantially all of the power to the output 640, both switched gratings would be set non-diffracting. This would not only direct substantially all of the input power to the output 640, but any input signal leaking through the first grating as diffracted light will be further attenuated from being crosstalk in the output 650 by the non-diffracting second grating.

If the embodiment of the switchable diffraction grating is not polarization sensitive, i.e., if it diffracts with the same diffraction efficiency regardless of the state of the incident polarization, then the polarization separating sub-systems 430 and the polarization combining sub-systems 450 of the configurations of FIGS. 9-11 are not necessary. Similarly, if the embodiment of the switchable diffraction gratings switch a single polarization, but that polarization is the only one incident on the system, then the polarization separating sub-systems 430 and the polarization combining sub-systems 450 of the configurations of FIGS. 9-11 are not necessary.

For example, if the embodiment of the switchable volume diffraction grating is such that beams of electromagnetic radiation with polarization in a predetermined plane of polarization are diffracted by the enabled grating and if the input beam 420 has a polarization in that predetermined plane of polarization, the polarization separating sub-system 430 and the polarization recombining sub-system 450 are not necessary and can be omitted from the system of this invention. Systems of this invention in which the input beam 420 has a polarization in the predetermined plane of polarization in which the switchable volume diffraction grating 510 preferably operates are shown in FIGS. 12a, 12b and 13.

Figure 12A:
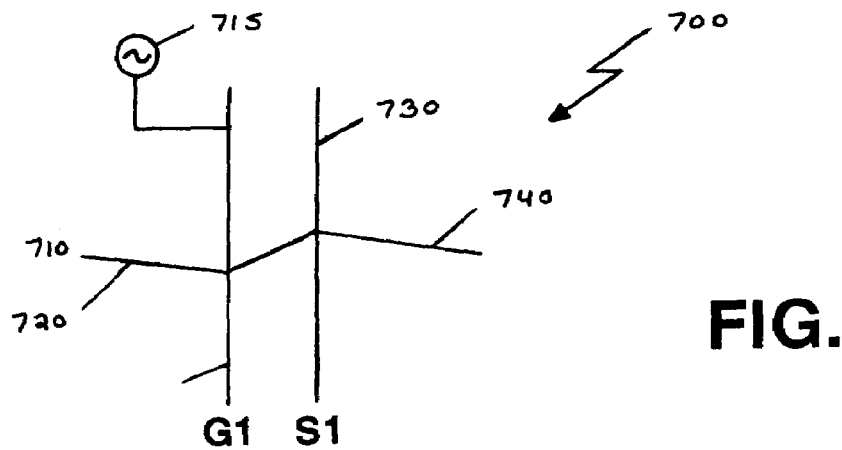
FIGS. 12a-12b are pictorial, schematic representations of yet another embodiment of a variable optical attenuator of this invention; and, FIG. 13 is a pictorial, schematic representation of another embodiment of a 1×2 optical switch of this invention.

During operation of the embodiment of FIG. 12a, when the switchable volume diffraction grating 720 is enabled (either by its initial state or by a switching control such as a voltage), the input beam encounters the switchable volume diffraction grating 720 and is diffracted. The diffracted beam is then further diffracted by the static grating 730 resulting in output beam 740. Since the diffraction efficiency of the switchable transmission volume grating varies continuously with applied voltage (switching control), the percentage of the optical power of the input channel that is diffracted to the output 740, and therefore the output optical power of the VOA of this invention, is continuously variable.

Figure 12B:
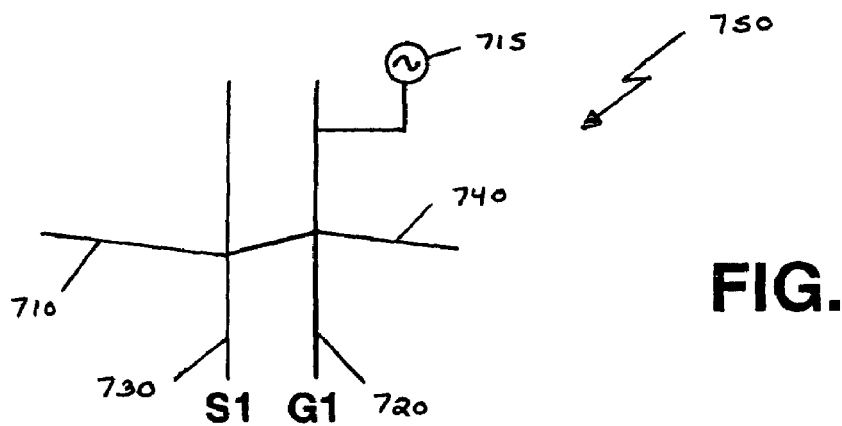

During operation of the embodiment of FIG. 12b, when the switchable volume diffraction grating 720 is enabled (either by its initial state or by a switching control such as a voltage), the input beam 710 encounters the static grating 730 and is diffracted. The diffracted beam then encounters the switchable volume diffraction grating 720 and is diffracted resulting in output beam 740.

Figure 13:
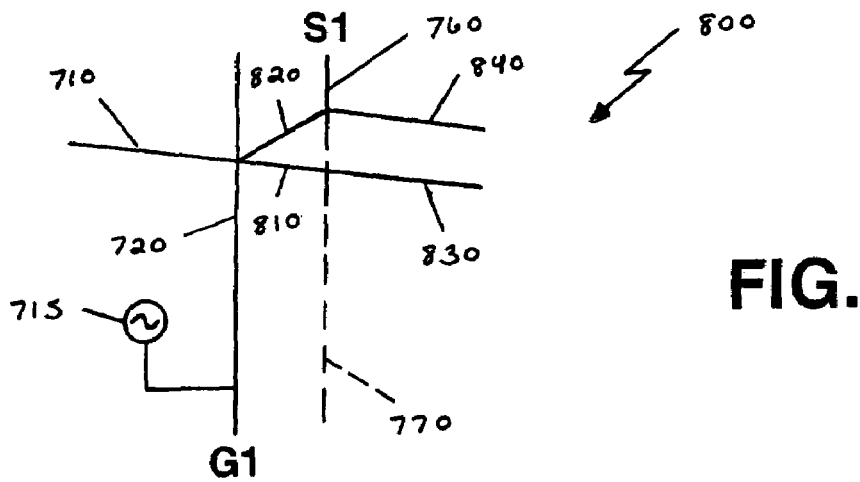

FIG. 13 shows an embodiment 700 of the 1×2 switch of this invention in which the input beam 710 has a polarization in the predetermined plane of polarization in which the switchable volume diffraction grating 720 preferably operates. During operation of the embodiment 800 of FIG. 13, when the switchable volume diffraction grating 720 is enabled (either by its initial state or by a switching control such as a voltage), the input beam encounters the switchable volume diffraction grating 720 and its optical power is divided among transmitted beam 810 and diffracted beam 820. Diffracted beam 820 is further diffracted by the static grating 760. Transmitted beam 810 is further diffracted by the static grating 760. Transmitted beam 810 is transmitted through the transparent region 770. The diffracted beam and the transmitted beam comprise the output beams 840, 830. The optical power in input beam 710 is variably divided into the two outputs 830 and 840 by setting the switchable grating 720 to a predetermined diffraction efficiency which is determined by the switching control 715 (voltage, in one embodiment). The switchable grating 720 is set to either substantially fully diffracting, substantially fully transmitting, or some intermediate state of diffraction efficiency by the control 715 (voltage, in one embodiment). It should be noted that by setting the switchable grating 720 to either substantially fully diffracting or substantially fully transmitting, the transmitted beam can be substantially absent or the diffracted beam can be substantially absent.

It should be noted that, in the embodiments of FIGS. 12a, 12b, and 13, the static grating may be, but is not limited to, a volume diffraction grating or may be replaced by a switchable volume diffraction grating.

It should also be noted that the switchable gratings of this invention may be volume holographic gratings, but may also be switchable gratings of other types including switchable surface relief gratings.

Although the invention has been described with respect to various embodiments, it should be realized this invention is also capable of a wide variety of further and other embodiments within the spirit and scope of the appended claims.

What is claimed is:

1. An optical switch/variable attenuator comprising:
a polarization separating sub-system;
at least one switchable transmission diffraction grating; and,
a polarization recombining sub-system;
means for varying a diffraction efficiency of said at least one switchable transmission diffraction grating;

said polarization separating sub-system being optically disposed to receive an input optical beam of arbitrary polarization and also being capable of separating the input optical beam into a first optical beam of a first polarization and a second optical beam of a second polarization, said second polarization being distinct from said first polarization, and emitting a first emitted optical beam of the first polarization and a second emitted optical beam of the first polarization, said emitted first and emitted second optical beams constituting an input channel of the first polarization;

said at least one switchable transmission diffraction grating being optically disposed to receive the input channel and capable of providing at least one transmitted channel, the at least one transmitted channel comprising at least one transmitted optical beam of the first polarization and at least one other transmitted optical beam of the first polarization; said at least one switchable transmission diffraction grating constituting a set of switchable transmission diffraction gratings; and, said polarization recombining sub-system being optically disposed to receive the at least one transmitted optical beam of the first polarization and the at least one other transmitted optical beam of the first polarization and capable of recombining the at least one transmitted optical beam of the first polarization and the at least one other transmitted optical beam of the first polarization into at least one final output beam; said at least one final output beam constituting a set of output beams.

2. The optical switch/variable attenuator of claim 1 further comprising:
a static grating optically disposed between said at least one switchable transmission diffraction grating and said polarization recombining sub-system; and,
wherein said at least one switchable transmission diffraction grating comprises one switchable transmission volume diffraction grating.

3. The optical switch/variable attenuator of claim 1 further comprising:

at least one control element capable of controlling switching of said at least one switchable transmission diffraction grating.

4. The optical switch/variable attenuator of claim 1 further comprising:
a static grating optically disposed between said
polarization separating sub-system and said at least one switchable transmission diffraction grating; and,
wherein said at least one switchable transmission diffraction grating comprises one switchable transmission diffraction grating.

5. The optical switch/variable attenuator of claim 1 wherein said set of switchable transmission diffraction gratings comprises two switchable transmission diffraction gratings;
a first of said two switchable volume transmission diffraction gratings being optically disposed between said polarization separating sub-system and a second of said two switchable volume transmission diffraction gratings; and,
the second of said two switchable volume transmission diffraction gratings being optically disposed between the first of said two switchable volume transmission diffraction gratings and said polarization recombining sub-system.

6. The optical switch/variable attenuator of claim 2 wherein said static grating includes a transparent region.

7. The optical switch/variable attenuator of claim 6 further comprising:
two output beam ports; and,
wherein said set of output beams comprises two final output beams;
each one of said two output beam ports being capable of receiving from said polarization recombining sub-system one final output beam from said two final output beams.

* * * * *

UNITED STATES PATENT AND TRADEMARK OFFICE
CERTIFICATE OF CORRECTION

| | | |
|---|---|---|
| PATENT NO. | : 7,333,685 B2 | Page 1 of 1 |
| APPLICATION NO. | : 10/720816 | |
| DATED | : February 19, 2008 | |
| INVENTOR(S) | : Thomas W. Stone et al. | |

It is certified that error appears in the above-identified patent and that said Letters Patent is hereby corrected as shown below:

Col. 1 lines 9-10, please add,

--STATEMENT REGARDING FEDERALLY SPONSORED RESEARCH OR DEVELOPMENT

This invention was conceived under U.S. Air Force Contract No. F30602-98-C-0079. The U.S. Government has certain rights in the invention.--

Signed and Sealed this

Fifth Day of August, 2008

JON W. DUDAS
*Director of the United States Patent and Trademark Office*